United States Patent
Kogo

(10) Patent No.: US 9,830,035 B2
(45) Date of Patent: *Nov. 28, 2017

(54) SEMICONDUCTOR DEVICE

(71) Applicant: RENESAS ELECTRONICS CORPORATION, Tokyo (JP)

(72) Inventor: Teruyuki Kogo, Itami (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/074,758

(22) Filed: Mar. 18, 2016

(65) Prior Publication Data

US 2016/0202836 A1 Jul. 14, 2016

Related U.S. Application Data

(63) Continuation of application No. 13/899,445, filed on May 21, 2013, now Pat. No. 9,292,137.

(30) Foreign Application Priority Data

May 21, 2012 (JP) ................................. 2012-115495

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 2203/04104* (2013.01)

(58) Field of Classification Search
CPC ......... G06F 2203/04104; G06F 3/0412; G06F 3/0416; G06F 3/044

USPC .................................................. 345/170–176
See application file for complete search history.

(56) References Cited

U.S. PATENT DOCUMENTS

| | | | |
|---|---|---|---|
| 8,624,852 B2* | 1/2014 | Kogo | H03K 17/962 324/658 |
| 8,711,121 B2 | 4/2014 | Gray | |
| 9,292,137 B2* | 3/2016 | Kogo | G06F 3/044 |
| 2010/0060608 A1 | 3/2010 | Yousefpor | |
| 2010/0302183 A1* | 12/2010 | Kogo | H03K 17/962 345/173 |

(Continued)

FOREIGN PATENT DOCUMENTS

| | | |
|---|---|---|
| JP | 2010-140465 A | 6/2010 |
| JP | 2011-014527 A | 1/2011 |

(Continued)

OTHER PUBLICATIONS

Notice of Allowance dated Oct. 19, 2015. issued in corresponding U.S. Appl. No. 13/899,445.

(Continued)

*Primary Examiner* — Tony Davis
(74) *Attorney, Agent, or Firm* — McDermott Will & Emery LLP

(57) ABSTRACT

A semiconductor device for use in a touch panel and capable of uniquely identifying the touched coordinates over the touch panel is disclosed. When a multi-touch state is detected over the touch panel by self-capacitance method, the semiconductor device isolates the multiple touch electrodes found to be in the touch state and has these electrodes identified by mutual capacitance method.

3 Claims, 8 Drawing Sheets

(56) References Cited

U.S. PATENT DOCUMENTS

2012/0113047 A1     5/2012   Hanauer et al.
2013/0307821 A1*   11/2013   Kogo ...................... G06F 3/044
                                                                  345/174
2016/0202836 A1*    7/2016   Kogo ...................... G06F 3/044
                                                                  345/174

FOREIGN PATENT DOCUMENTS

JP       2011-113506 A    6/2011
JP       2012-050239 A    3/2012

OTHER PUBLICATIONS

Non-Final Office Action dated Jun. 18, 2015, issued in corresponding U.S. Appl. No. 13/899,445.
Japanese Office Action issued in Japanese Patent Application No. 2012-115495, dated Jan. 12, 2016.

* cited by examiner

SEMICONDUCTOR DEVICE

CROSS REFERENCE TO RELATED APPLICATIONS

This application is a continuation application of U.S. Ser. No. 13/899,445, filed May 21, 2013, which claims priority from Japanese Patent Application No. 2012-115495 filed on May 21, 2012, the disclosures of which are incorporated herein by reference in their entirety.

BACKGROUND

The present invention relates to a semiconductor device. More particularly, the invention relates to a semiconductor device suitable for use in detecting touch events taking place over a capacitative touch panel, for example.

Touch events occurring over the touch panel (touch screen) are known to be detected using diverse detection methods such as resistive membrane method, optical method, ultrasonic sensing method, and capacitive sensing method (surface type and projection type). Of these methods, the projection type capacitive sensing method is most commonly used for the touch panel attached to smartphones, tablet terminals and the like.

The projection type capacitive sensing method comes in two types: self-capacitance method and mutual capacitance method. The self-capacitance method involves having X-direction touch electrodes and Y-direction touch electrodes arrayed in a grid-like pattern. Sensing growing stray capacitance of each of the touch electrodes detects whether a human fingertip has approached (e.g., see Japanese Unexamined Patent Publication No. 2011-14527).

The mutual capacitance method involves having transmitting electrodes and receiving electrodes arrayed in a grid-like pattern. With pulses input to each of the transmitting electrodes, sensing a change in the signal received by each of the receiving electrodes detects whether the human fingertip has approached (e.g., Japanese Unexamined Patent Application Publication No. 2012-502397).

SUMMARY

The self-capacitance method has the advantage of entailing less wiring leading to greater ease of implementation and involving shorter scanning time resulting in less power consumed than the mutual capacitance method. However, the self-capacitance method has the problem of so-called ghost generation. This is a phenomenon in which when a plurality of locations over the touch panel are simultaneously touched, their coordinates cannot be determined uniquely.

With the mutual capacitance method, the problem of ghost generation is nonexistent since multiple locations touched simultaneously have their coordinates determined uniquely. However, the mutual capacitance method has the problem of dissipating more power than the self-capacitance method.

These and other objects and novel features of the invention may be readily ascertained by referring to the following description and appended drawings.

According to one embodiment of the present invention, there is provided a semiconductor device whereby, when a multi-touch is detected by the self-capacitance method, only those touch electrodes over which the multi-touch is detected are isolated and their coordinates are identified by the mutual capacitance method.

The embodiment above of this invention allows the coordinates touched over the touch panel to be uniquely determined.

DETAILED DESCRIPTION

First Embodiment

[Structure and Operation of the Semiconductor Device (IC for Use in the Touch Panel)]

Figure 1:
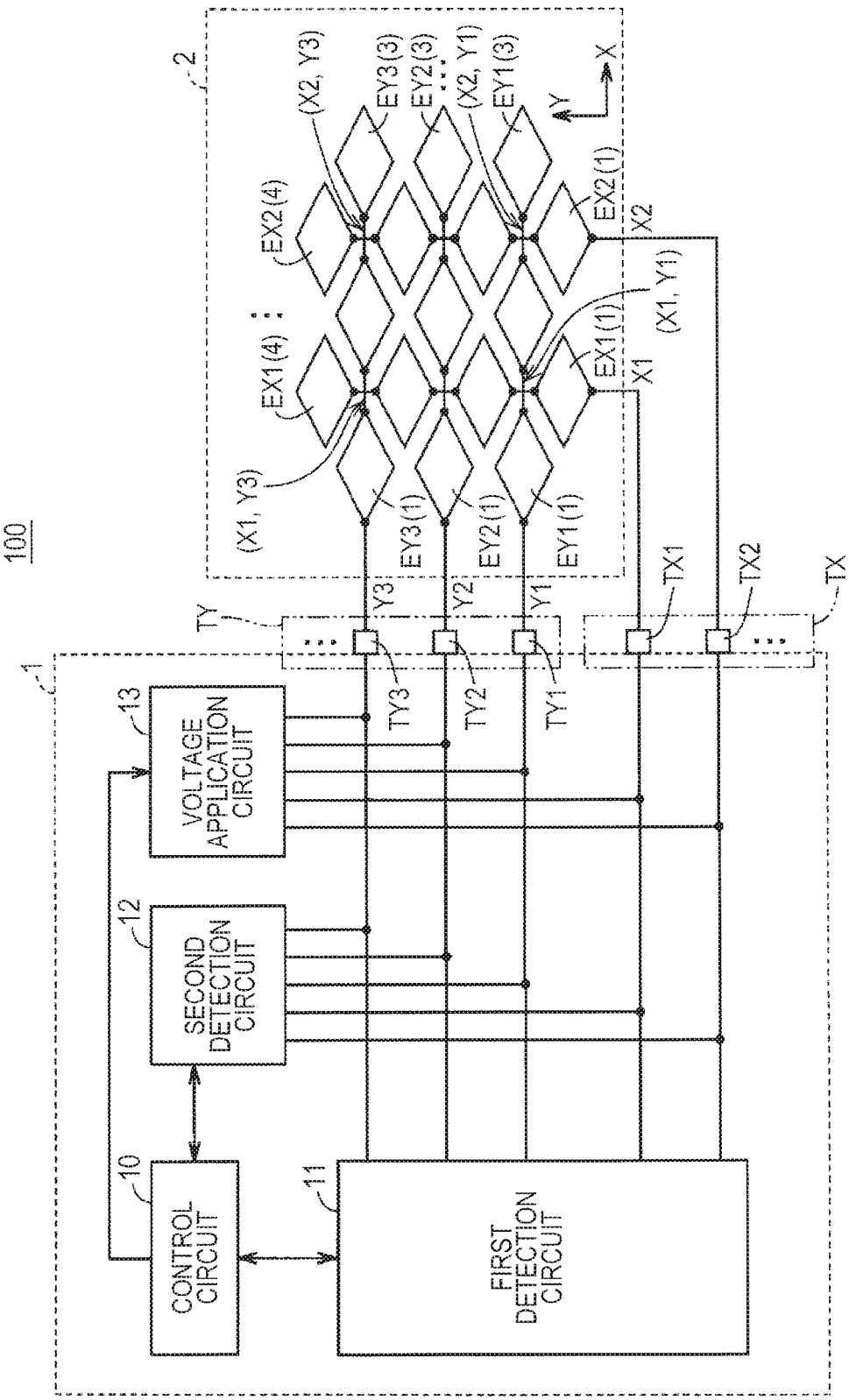
FIG. 1 is a block diagram showing a structure of a semiconductor device 1 as a first embodiment of the present invention.

FIG. 1 is a block diagram showing a structure of a semiconductor device 1 as the first embodiment of the present invention. Also shown in FIG. 1 is a touch panel 2 to be coupled to the semiconductor device 1. A touch sensor 100 is configured using the semiconductor device (IC (integrated circuit) for use in the touch panel) 1 and touch panel 2.

Figure 2:
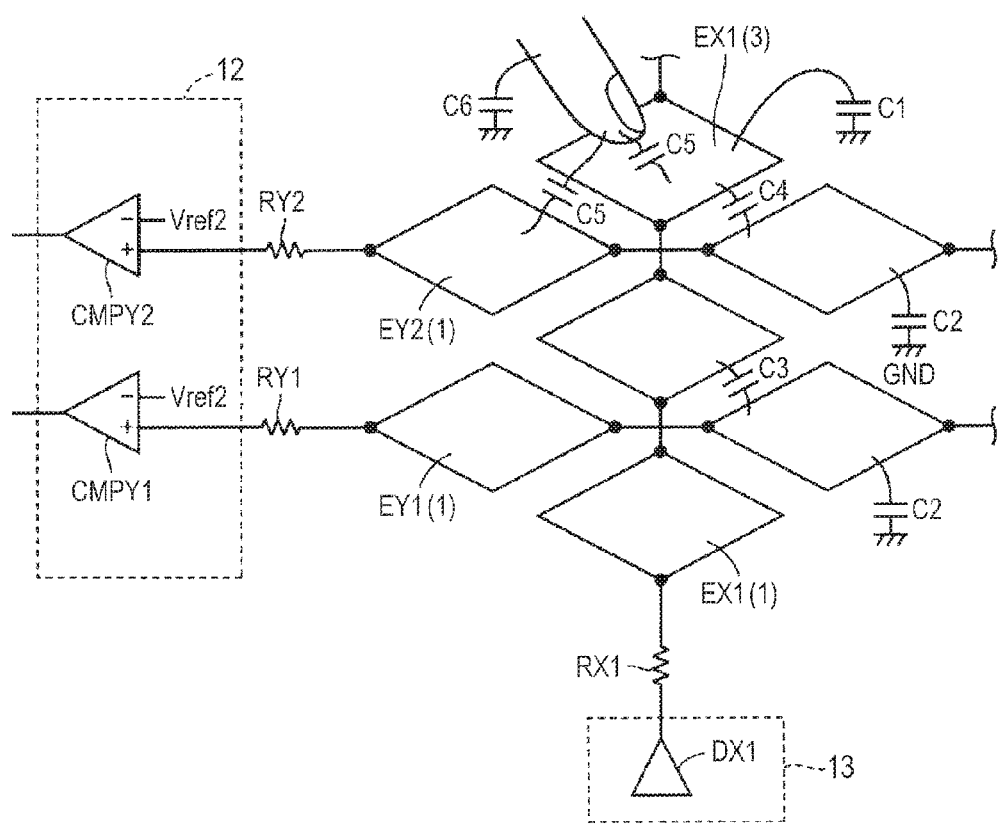
FIG. 2 is a perspective view showing schematically a state in which a fingertip approaches a touch panel.

Referring to FIG. 2, the touch panel operates on the self-capacitance method and includes a first touch electrode group EX (EX1(1) through EX1(a), EX2(1) through EX2(a), . . . , EXm(1) through EXm(a)) and a second touch electrode group EY (EY1(1) through EY1(b), EY2(1) through EY2(b), EY3(1) through EY3(b), . . . , EYn(1) through EYn(b)). The touch electrodes in each of the columns making up the first touch electrode group EX are formed by a plurality of lozenge-shaped electrodes mutually coupled in the Y direction. For example, the touch electrodes EX1 in the first column are formed by as many as "a" lozenge-shaped electrodes EX1(1) through EX1(a) serially coupled in the Y direction. The touch electrodes in each of the rows making up the second touch electrode group EY are formed by a plurality of lozenge-shaped electrodes mutually coupled in the X direction. For example, the touch electrodes EY1 in the first column are formed by as many as "b" lozenge-shaped electrodes EY1(1) through EY1(b) serially coupled in the X direction. The first touch electrode group EX and the second touch electrode group EY are arrayed in a matrix pattern but are not mutually coupled.

The semiconductor device 1 includes a first external terminal group TX (TX1, TX2, . . . ), a second external terminal group TY (TY1, TY2, . . . ), a first detection circuit 11, a voltage application circuit 13, a second detection circuit 12, and a control circuit 10 that controls the overall performance of the semiconductor device 1. The external terminals TX1, TX2, etc., are coupled to the touch electrodes EX1, EX2, etc., respectively, and the external terminals TY1, TY2, TY3, etc., are coupled to the touch electrodes EY1, EY2, EY3, etc., respectively. Generally, a protective resistor (not shown) is provided interposingly between each of the external terminals TX1, TX2, etc., on the one hand, and each of the corresponding touch electrodes EX1, EX2, etc., on the other hand. A protective resistor (not shown) is also provided interposingly between each of the external terminals TY1, TY2, etc., on the one hand, and each of the corresponding touch electrodes EY1, EY2, etc., on the other hand.

The first detection circuit 11 is coupled to the touch electrode groups EX and EY via the external terminal groups TX and TY. As such, the first detection circuit 11 detects whether there has occurred higher stray capacitance of each touch electrode than when the touch panel 2 is not touched.

Based on the result of the detection by the first detection circuit 11, the control circuit 10 identifies the touch electrode of which the stray capacitance has increased. When there is one touch electrode of which the stray capacitance has increased in the first touch electrode group EX or in the second touch electrode group EY, the control circuit 10 identifies as a touched area (touch coordinates) the area where the touch electrode having the increased stray capacitance in the first touch electrode group EX intersects with the touch electrode having the increased stray capacitance in the second touch electrode group EY.

The way the touch coordinates are detected as described above is the so-called self-capacitance method. For example, when the human fingertip approaches the point of intersection between the touch electrode EX1(1) and the touch electrode EY1(1)(coordinates (X1, Y1)), stray capacitance increases in the touch electrodes EX1 and EY1. The control circuit 10 identifies the touch as taking place in the vicinity of the coordinates (X1, Y1) given that stray capacitance is detected to have increased in the touch electrodes EX1 coupled to the terminals TX1 and in the touch electrodes EY1 coupled to the terminals TY1.

According to the self-capacitance method, it is impossible to identify uniquely the coordinates of a multi-touch in which stray capacitance increases in a plurality of touch electrodes in the first touch electrode group EX and in a plurality of touch electrodes in the second touch electrode group EY. For example, suppose that in FIG. 1, human fingertips have approached the vicinity of the point of intersection between the touch electrodes EX1(1) and EY1(1)(coordinates (X1, Y1)) and the vicinity of the point of intersection between the touch electrodes EX2(3) and EY3(2)(coordinates (X2, Y3)). In this case, the increases in stray capacitance of the touch electrodes EX1, EX2, EY1 and EY3 are detected but the combinations of these touch electrodes cannot be identified. Thus it is impossible to exclude the possibility that the vicinity of coordinates (X1, Y3) and that of coordinates (X2, Y1) may have been touched (these putative touches are called ghosts). Generally, when N locations are touched over the touch panel 2, there occur N×(N−1) ghosts.

The semiconductor device 1 of FIG. 1 includes the voltage application circuit 13 and second detection circuit 12 in order to exclude ghosts. Specifically, when the control circuit 10 identifies a multi-touch state, the voltage application circuit 13 applies a voltage to the touch electrodes having increased stray capacitance in the first touch electrode group EX. In the above example (i.e., where the first detection circuit 11 has detected increased stray capacitance of the touch electrodes EX1, EX2, EY1 and EY3, the voltage application circuit 13 applies a voltage to the touch electrodes EX1 and EX2, in that order.

With the voltage thus applied by the voltage application circuit 13, the second detection circuit 12 detects a voltage change of the touch electrodes of which the increased stray capacitance has been detected in the second touch electrode group EY. Based on the result of the detection by the second detection circuit 12, the control circuit 10 identifies the touched coordinates (a specific method for achieving this will be discussed later in reference to FIGS. 2 through 4). That is, when a multi-touch is detected by the self-capacitance method, the control circuit 10 isolates the touch electrodes of which the multi-touch is detected and identifies the touched coordinates using the mutual capacitance method.

Contrary to the case above, when the control circuit 10 identifies a multi-touch state, the voltage application circuit 13 may apply a voltage to each of the touch electrodes of which the stray capacitance has increased in the second touch electrode group EY. At this point, the second detection circuit 12 may detect a voltage change of each of the touch electrodes of which the stray capacitance has increased in the first touch electrode group EX.

[Method for Identifying the Touched Coordinates]

Figure 3:
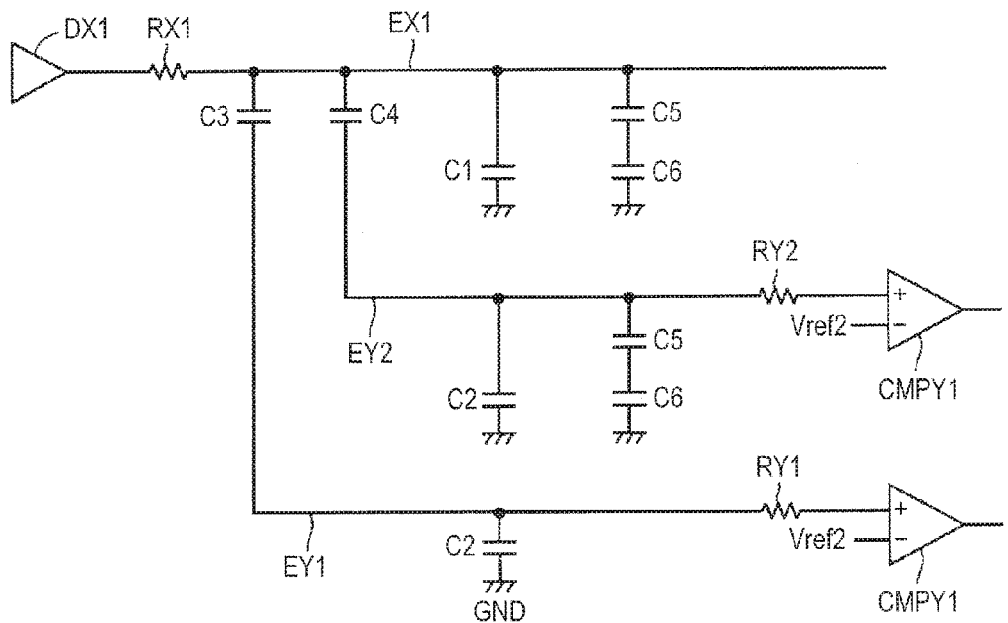
FIG. 3 is an equivalent circuit diagram of FIG. 2.

FIG. 2 is a perspective view showing schematically a state in which a fingertip approaches a touch panel. FIG. 3 is an equivalent circuit diagram of FIG. 2. In FIGS. 2 and 3, only the touch electrodes EX1, EY1 and EY2 are shown representatively. What is shown here is the state in which the fingertip approaches the vicinity of the point of intersection between the touch electrode EX1(3) in the first touch electrode group EX on the one hand, and the touch electrode EY2(1) in the second touch electrode group EY on the other hand.

Referring to FIGS. 2 and 3, it is assumed that C1 denotes the stray capacitance between each touch electrode EX1 in the first touch electrode group EX and a ground node GND and that C2 represents the stray capacitance between each of the touch electrodes EY1 and EY2 in the second touch electrode group EY on the one hand and the ground node on the other hand. It is also assumed that C3 stands for the capacitance between the touch electrodes EX1 and EY1 and C4 for the capacitance between the touch electrodes EX1 and EY2 (capacitance C3 is approximately equal to capacitance C4). It is further assumed that C5 denotes the capacitance between the fingertip and each of the touch electrodes EX1(3) and EY2(1) and that C6 represents the capacitance between the fingertip (human body) and the ground node GND.

Resistive elements RX1, RY1 and RY2 represent protective resistors installed between the touch panel 2 in FIG. 1 on the one hand and the external terminals TX1, TY1 and TY2 on the other hand. Where the protective resistors are not provided, the resistive elements may be interpreted to denote the resistance values of the touch electrodes EX1, EY1 and EY2 themselves.

The voltage application circuit 13 includes a driver DX1 for applying a voltage to the touch electrodes EX1. The detection circuit 12 includes a comparator CMPY1 for comparing the voltage of the touch electrodes EY1 with a reference voltage Vref2, and a comparator CMPY2 for comparing the voltage of the touch electrodes EY2 with the reference voltage Vref2. Alternatively, only one of the two comparators CMPY1 and CMPY2 may be installed by switching by a switching circuit.

The touch electrodes EX1 and EY2 being approached (i.e., touched) by the fingertip have their capacitance with respect to the ground node GND increased by as much as a capacitance value C56 in effect when C5 and C6 are serially coupled (C56=C5×C6/(C5+C6)).

Figure 4:
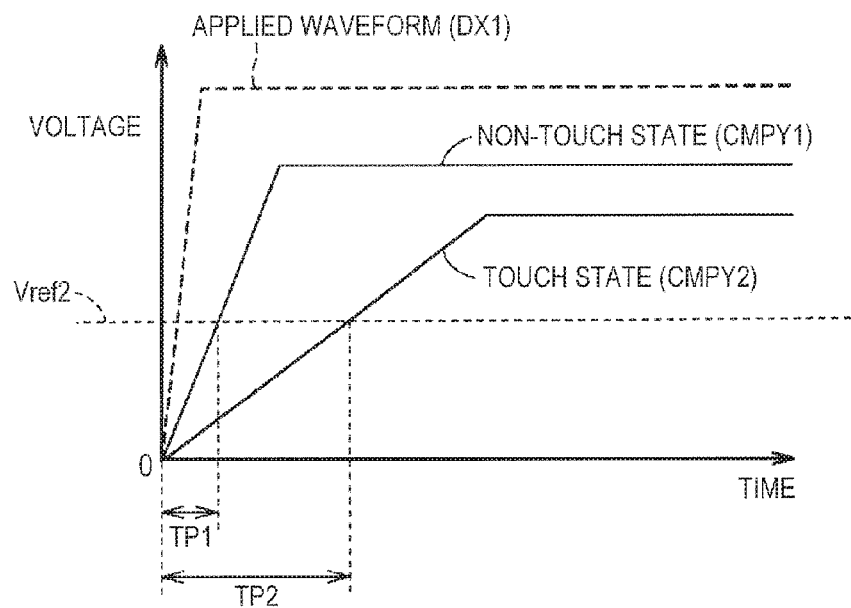
FIG. 4 is a waveform chart showing an applied waveform from a driver DX, an input waveform to the positive (+) terminal of a comparator CMPY1, and another input waveform to the positive terminal of another comparator CMPY2 indicated in FIGS. 2 and 3.

FIG. 4 is a waveform chart showing an applied waveform from the driver DX1, an input waveform to the positive (+) terminal of the comparator CMPY1, and another input waveform to the positive terminal of the comparator CMPY2 indicated in FIGS. 2 and 3.

Referring to FIG. 4, the voltage input to the comparator CMPY1 coupled to the touch electrodes EY1 in a non-contact state rises in accordance with a time constant determined by the resistance value Rx of the resistive element RX1 and by the capacitance C2 and C3. On the other hand, the voltage input to the comparator CMPY2 coupled to the touch electrodes EY2 in a touch state increases in accordance with a time constant determined by the resistance value Rx of the resistive element RX1 and by the capacitance C4, C2, C5 and C6. That means the rise in the voltage input to the comparator CMPY2 is less steep than in the voltage input to the comparator CMPY1. Specifically, the time constant TC1 in the former case is expressed as follows:

$$TC1=C2\times C3\times Rx/(C2+C3) \qquad (1)$$

The time constant TC2 in the latter case is expressed as follows:

$$TC2=(C2+C56)\times C4\times Rx/(C2+C4+C56) \qquad (2)$$

Since C3 and C4 are approximately equal, TC2 becomes larger than TC1.

As a result, the times required for the voltages input to the positive terminals of the comparators CMPY1 and CMPY2 to exceed the reference voltage Vref2 are TP1 and TP2, respectively. It takes longer for the touch state touch electrodes EY2 to exceed the reference voltage than the non-touch state electrodes EY1. Thus determining whether the time required for the comparator output to go high when the touch panel is touched is longer than when the touch panel is not touched helps identify the actually touched coordinates and eliminate ghosts.

Effects of the First Embodiment

According to the semiconductor device 1 described above as the first embodiment of this invention, when a multi-touch is detected by the self-capacitance method, only the touch electrodes of which the multi-touch has been detected are isolated and the touched coordinates are identified by the mutual capacitance method. This makes it possible to uniquely identify the touched coordinates (with no ghosts generated) in the multi-touch case. Furthermore, the first embodiment consumes less power than when all electrodes are determined using the mutual capacitance method.

Second Embodiment

[Structure of the Semiconductor Device 1A]

Figure 5:
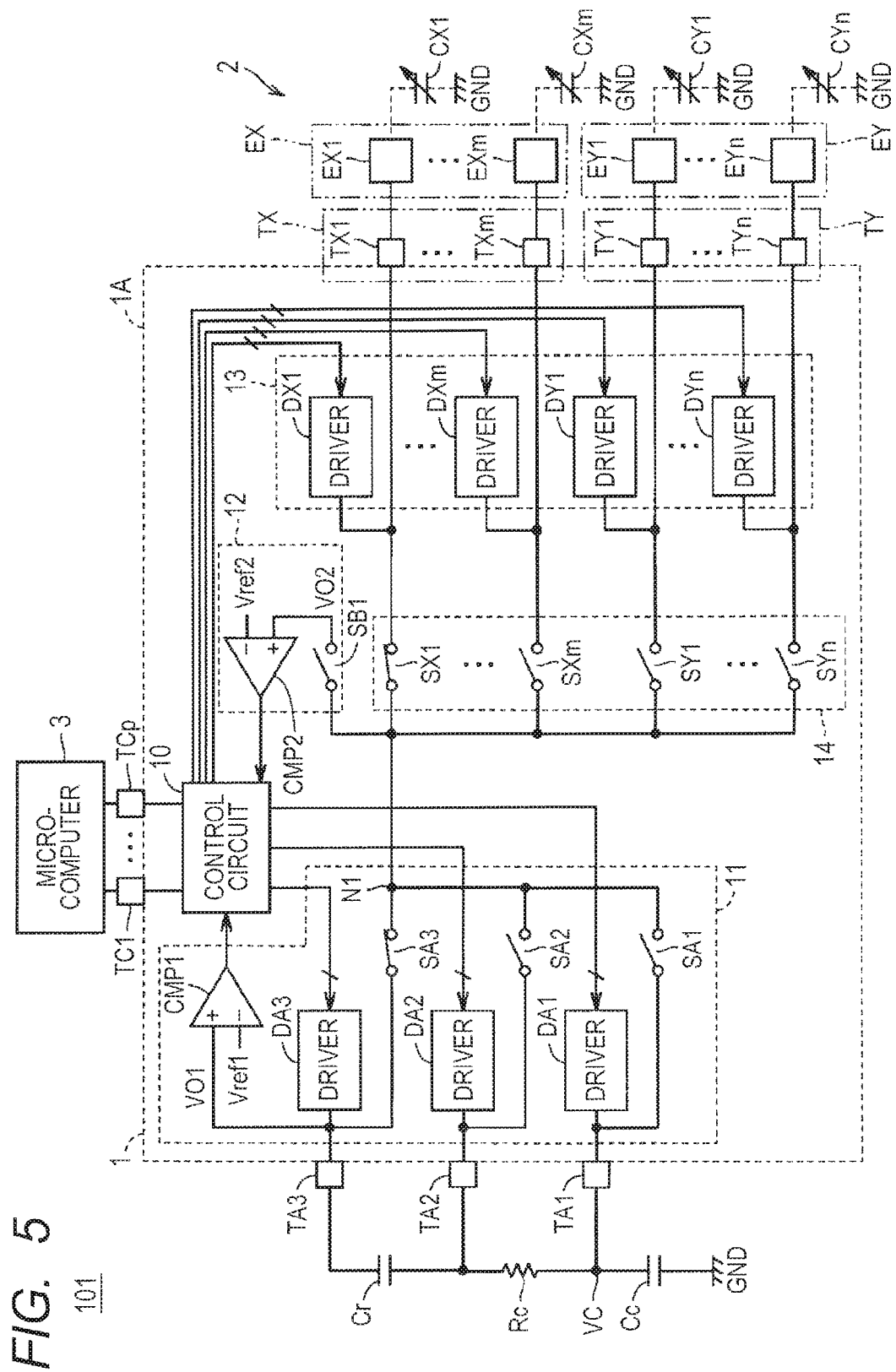
FIG. 5 is a block diagram showing a structure of a touch sensor 101 having a semiconductor device 1A as a second embodiment of the present invention.

FIG. 5 is a block diagram showing a structure of a touch sensor 101 having a semiconductor device 1A as the second embodiment of the present invention. Referring to FIG. 5, the touch sensor 101 includes the semiconductor device (IC for use in the touch panel) 1A, a touch panel 2, a microcomputer 3, capacitive elements Cr and Cc, and a resistive element Rc. The semiconductor device 1A in FIG. 5 is an example of the specific structure of the semiconductor device 1 in FIG. 1.

The touch panel 2 has the same structure as in the first embodiment shown in FIG. 1, and includes the first touch electrode group EX (formed by as many as "m" touch electrodes EX1 through EXm) and the second touch electrode group EY (formed by "n" touch electrodes EY1 through EYn). In FIG. 5, the touch electrodes EX1 through EXm and EY1 through EYn are illustrated in simplified fashion, with the stray capacitance of the touch electrodes EX1 through EXm and EY1 through EYn represented by CX1 through CXm and CY1 through CYn, respectively. The touch electrodes EX1 through EXm and EY1 through EYn are coupled respectively to external terminals TX1 through TXm and TY1 through TYn attached to the semiconductor device 1A.

The microcomputer 3 is coupled to as many as "p" external terminals TC1 through TCp attached to the semiconductor device 1A. The microcomputer 3 controls the semiconductor device 1A and, given signals indicative of whether the human body (fingertip) has touched the touch panel 2 as well as signals representing the touched coordinates from the semiconductor device 1A, controls control target electrical devices in response to the received signals.

The capacitor Cc is coupled between an external terminal TA1 attached to the semiconductor device 1A and a ground node GND. The capacitance value of the capacitor Cc is set to about 0.1 μF, for example. The resistive element Rc is coupled between the external terminal TA1 and an external terminal TA2 attached to the semiconductor device 1A. The resistance value of the resistive element Rc is set to about 3 to 10 kΩ, for example. The capacitor Rc is coupled between the external terminal TA2 and an external terminal TA3 attached to the semiconductor device 1A. The capacitance value of the capacitor Cr is set to about 1 to 50 pF, for example.

The semiconductor device 1A includes a switching circuit 14 and external terminals TC1 through TCp, TA1, TA2 and TA3 in addition to the control circuit 10, first detection circuit 11, second detection circuit 12, voltage application circuit 13, and external terminals TX1 through TXm and TY1 through TYn explained above in conjunction with the semiconductor device 1 of FIG. 1. FIG. 5 further indicates specific structure examples of the first detection circuit 11, second detection circuit 12, and voltage application circuit 13.

The switching circuit 14 under instructions of the control circuit 10 couples a node N1 selectively to one of the external terminals TX1 through TXm and TY1 through TYn. In the case of FIG. 5, the switching circuit 14 includes switches SX1 through SXm and SY1 through SYn. The terminals at one end of the switches SX1 through SXm and SY1 through SYn are commonly coupled to the node N1. The terminals at the other end of the switches SX1 through SXm and SY1 through SYn are coupled to the external terminals TX1 through TXm and TY1 through TYn, respectively.

The first detection circuit 11 includes drivers DA1 through DA3, switches SA1, SA2 and SA3, and a comparator CMP1. The output nodes of the drivers DA1 through DA3 are coupled to the external terminals TA1 through TA3, respectively. The drivers DA1 through DA3 each under control of the control circuit 10 control the corresponding external terminals TA to the "High" level (e.g. supply voltage), to the "Low" level (e.g. ground voltage), or to the "HiZ" (high impedance) state. In so doing, the drivers DA1 through DA3 charge and discharge the capacitor Cc and Cr and the stray capacitance CX1 through CXm and CY1 through CYn of the touch electrodes.

Figure 6:
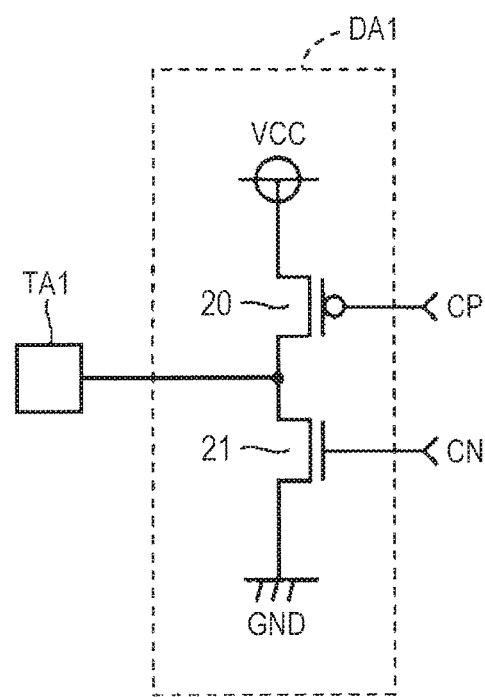
FIG. 6 is a circuit diagram showing a typical structure of each of drivers DA1 to DA3.

FIG. 6 is a circuit diagram showing a typical structure of each of the drivers DA1 through DA3. FIG. 6 shows representatively the structure of the driver DA1. The structure of the driver DA2 and that of the driver DA3 are the same as what is shown in FIG. 6.

Referring to FIG. 6, the driver DA1 includes a P-channel MOS transistor 20 and an N-channel MOS transistor 21. The transistors 20 and 21 are serially coupled, in that order, between a power supply node VCC and the ground node GND. Control signals CP and CN from the control circuit 10 are input to the gates of the transistors 20 and 21, respectively. A coupling node between the transistors 20 and 21 serves as the output node of the driver DA1 and is coupled to the corresponding external terminal TA1.

When the control signals CP and CN are both set to the Low level, the transistor 20 conducts and the transistor 21 does not conduct, driving the output node of the driver DA1 to the High state. When the control signals CP and CN are both set to the High level, the transistor 20 does not conduct and the transistor 21 conducts, driving the output node of the driver DA1 to the Low state. When the control signal CP is set to the High level and the control signal CN to the Low level, the transistors 20 and 21 both do not conduct, driving the output node of the driver DA1 to the HiZ state.

Referring again to FIG. 5, the terminals at one end of the switches SA1 through SA3 are coupled to the external terminals TA1 through TA3, respectively. The terminals at the other end of the switches SA1 through SA3 are coupled to the node N1. The switches SA1 through SA3 are switched on or off under instructions of the control circuit 10.

The non-inverting input terminal (positive terminal) of the comparator CMP1 is coupled to the external terminal TA3. A reference voltage Vref1 is input to the inverting input terminal (negative terminal) of the comparator CMP1. The comparator CMP1 outputs a signal that is set to the High level when the voltage of the external terminal TA3 exceeds the reference voltage Vref1.

The voltage application circuit 13 includes drivers DX1 through DXm and DY1 through DYn of which the structure is the same as that in FIG. 6. The output nodes of the drivers DX1 through DXm and DY1 through DYn are coupled to the external terminals TX1 through TXm and TY1 through TYn, respectively. Each of the drivers DX1 through DXm under control of the control circuit 10 controls the corresponding external terminal TX to the High level, to the Low level, or to the HiZ state. This causes the drivers DX1 through DXm to apply a voltage selectively to one of the touch electrodes EX1 through EXm. Each of the drivers DY1 through DYn under control of the control circuit 10 controls the corresponding external terminal TY to the Low level or to the HiZ state. The drivers DY1 through DYn of the second embodiment need not be provided with the PMOS transistor 20 shown in FIG. 6.

The second detection circuit 12 includes a comparator CMP2 and a switch SB1. The non-inverting input terminal (positive terminal) of the comparator CMP2 is coupled to the node N1 via the switch SB1. The reference voltage Vref2 is input to the inverting input terminal (negative terminal) of the comparator CMP2. The comparator CMP2 compares the reference voltage Vref2 with the voltage of the external terminal selected by the switches SY1 through SYn from among the external terminals TY1 through TY2. When the voltage of the selected external terminal exceeds the reference voltage Vref2, the comparator CMP2 outputs a High-level signal.

[Operation of the First Detection Circuit 11 and Control Circuit 10: Detecting Operation by the Self-Capacitance Method]

Figure 7:
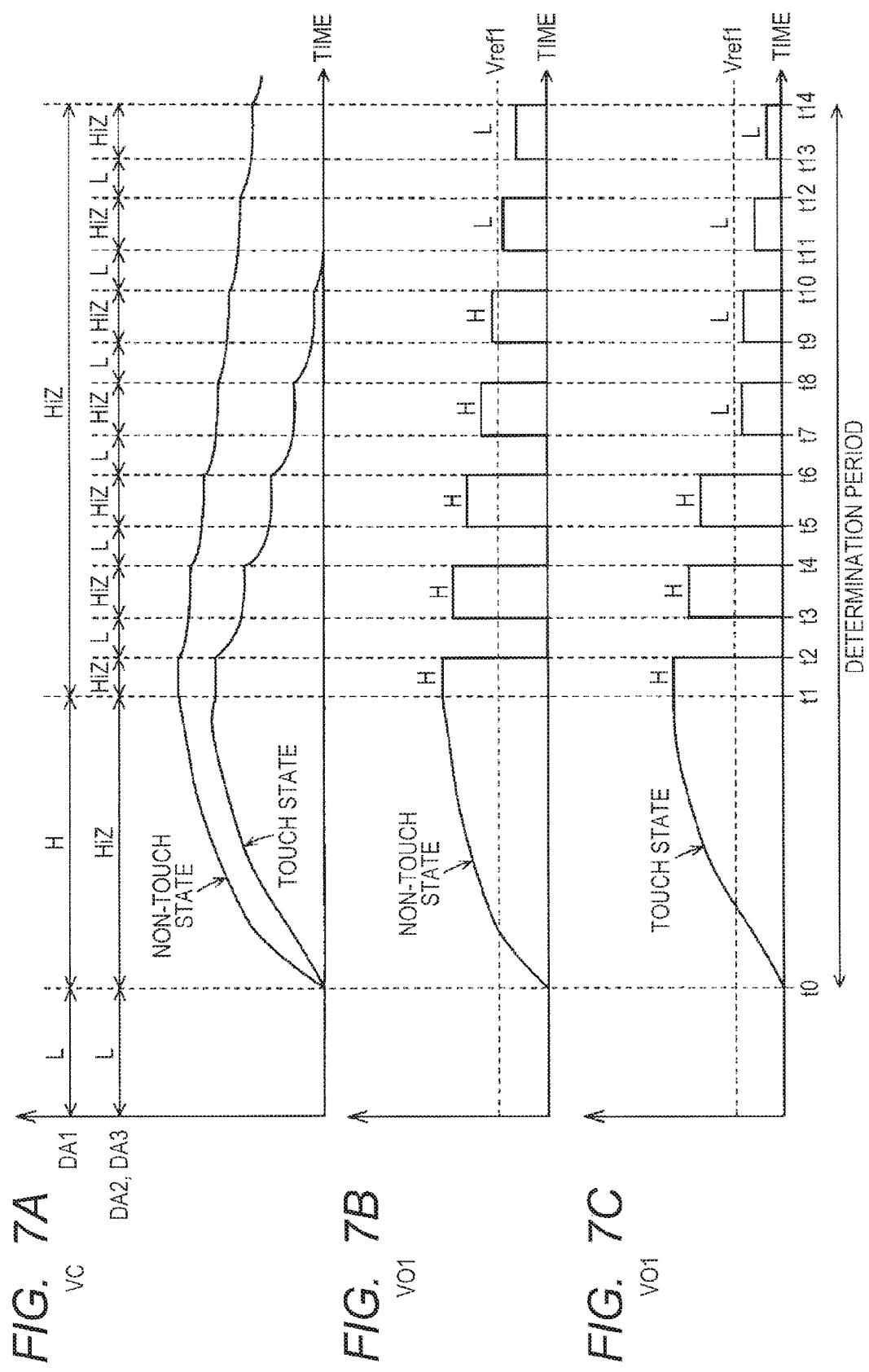
FIGS. 7A, 7B and 7C are timing charts showing the operation performed by a first detection circuit 11 and a control circuit 10.

FIGS. 7A, 7B and 7C are timing charts showing the operation of the first detection circuit 11 and control circuit 10. FIG. 7A shows a time change of a voltage VC (i.e., voltage across the terminals of the capacitor Cc) of the external terminal TA1. FIG. 7B shows a time change of a voltage VO1 of the external terminal TA3 in effect when the touch panel 2 is not touched (in the non-touch state). FIG. 7C shows a time change of the voltage VO1 of the external terminal TA3 in effect when the touch panel 2 is touched (in the touch state).

Explained below in reference to FIG. 5 through FIGS. 7A, 7B and 7C is the operation performed by the first detection circuit 11 and control circuit 10 (i.e., operation for detecting a touch event using the self-capacitance method). In this detecting operation, the second detection circuit 12 and voltage application circuit 13 are not used. Thus the second detection circuit 12 has its switch SB1 set to the off state, and the voltage application circuit 13 has the output nodes of its drivers DX1 through DXm and DY1 through DYn set to the HiZ state.

In the initial state before time t0, the drivers DA1 through DA3 all output the Low level. The switches SA1 through SA3, SX1 through SXm, and SY1 through SYn conduct; and the external terminals TA1 through TA3, TX1 through TXm, and TY1 through TYn are reset to the Low level.

Between time t0 and time t1 is the period for charging. During the charging period, the capacitor Cc is charged with electrical charges (charging operation). Specifically, at time t0, the microcomputer 3 issues a detection request to the control circuit 10. In turn, the control circuit 10 causes the switches SA1, SA3 and SX1 to conduct and the switches SA2, SX2 through SXm, and SY1 through SYn not to conduct so as to couple the touch electrode EX1 to the external terminal TA3. Furthermore, the control circuit 10 controls the drivers DA1 through DA3 to set the output nodes of the drivers DA2 and DA3 (external terminals TA2 and TA3) to the HiZ state and the output node of the driver DA1 (external terminals TA1) to the High level. These settings allow a current to flow into the capacitors Cc and Cr and into the stray capacitance CX1 of the touch electrode EX1, thereby raising the voltage VC of the external terminal TA1.

The capacitance value CX1a of the touch electrode EX1 in effect when a fingertip is approaching the touch electrode EX1 (in touch state) is larger than the capacitance value CX1b of the touch electrode EX1 in effect when the fingertip is not approaching the touch electrode EX1 (in non-touch state)(CX1a>CX1b). Thus the rate at which the voltage VC rises when the fingertip is approaching the touch electrode EX1 (in touch state) is higher than the rate of the voltage rise in effect when the fingertip is not approaching the touch electrode EX1 (in non-touch state).

Then at time t1, the control circuit 10 causes the switch SA1 not to conduct and sets the output nodes of the drivers DA1 through DA3 to the HiZ state, thereby stopping the charging of the capacitors Cc, Cr and CX1.

Between time t2 and time t3 is the period for discharging. Specifically, at time t2, the control circuit 10 controls the drivers DA1 through DA3 to hold the output node of the driver DA1 (external terminal TA1) in the HiZ state and sets the output nodes of the drivers DA2 and DA3 (external terminals TA2 and TA3) to the Low level. These settings cause the capacitor Cc to discharge part of its electrical charges to the driver DA2 by way of the resistive element Rc and external terminal TA2, thereby lowering the voltage VC of the external terminal TA1 and fully discharging the capacitors Cr and CX1.

Between time t3 and time t4 is the period for detection. Specifically, at time t3, the control circuit 10 controls the drivers DA1 through DA3 in such a manner that the output node of the driver DA1 is held in the HiZ state and that the output nodes of the drivers DA2 and DA3 are set to the HiZ state. These settings cause the capacitor Cc to release part of its electrical charges to the capacitors Cr and CX1 by way of the resistive element Rc, thereby lowering the voltage VC of the external terminal TA1 and raising the voltage VO1 of the external terminal TA3. The capacitance value CX1a of the touch electrode EX1 in effect when the fingertip is approaching the touch electrode EX1 (in touch state) is larger than the capacitance value CX1b of the touch electrode EX1 in effect when the fingertip is not approaching the touch electrode EX1 (in non-touch state)(CX1a>CX1b). Thus the voltage VO1 in effect when the fingertip is approaching the touch electrode EX1 (in touch state) becomes lower than the voltage VO1 in effect when the fingertip is not approaching the touch electrode EX1 (in non-touch state). Because the electrical charges of the capacitor Cc are partially discharged between time t2 and time t3 through the resistive element Rc, the level of the voltage VO1 at this point is lower than between time t1 and time t2.

During the detection period, the comparator CMP1 compares the level of the voltage VO1 of the external terminal TA3 with the reference voltage Vref1. When the voltage VO1 is found higher than the reference voltage Vref1 (VO1>Vref1), the voltage VO1 is determined to be on the High level; when the voltage VO1 is found lower than the reference voltage Vref1 (VO1<Vref1), the voltage VO1 is determined to be on the Low level (detection operation). The control circuit 10 sets the output nodes of the drivers DA1 through DA3 to the HiZ state and, upon elapse of a predetermined time period, acquires the result of the detection by the comparator CMP1. It should be noted that the reference voltage Vref1 is between the ground voltage and the power supply voltage (e.g., ½ of the power supply voltage).

When the voltage VO1 is determined to be on the High level, the control circuit 10 increments the High level count by 1; when the voltage VO1 is determined to be on the Low level, the control circuit 10 increments the Low level count by 1. Between time t3 and time t4, the voltage VO1 is found higher than the reference voltage (VO1>Vref1) in each of FIGS. 7A through 7C in both the touch state and the non-touch state. In these cases, the control circuit 10 increments the High level count by 1.

Thereafter, the control circuit 10 alternately performs the discharging operation in which the external terminals TA2 and TA3 are set to the Low level to partially discharge the capacitor Cc and to fully discharge the capacitors Cr and CX1, and the detection operation in which the external terminals TA2 and TA3 are set to the HiZ state to distribute part of the electrical charges of the capacitor Cc to the capacitors Cr and CX1 before comparing the voltage VO1 of the external terminal TA3 with the reference voltage Vref1 in terms of level.

FIGS. 7A through 7C show the example in which the discharging operation and detection operation are each repeated six times after a charging operation (between time t0 and t1). When the touch electrode EX1 is not in contact with the human body (in non-touch state), the voltage VO1 is determined to be on the High level four times and on the Low level twice. When the touch electrode EX1 is in contact with the human body (in touch state), the voltage VO1 is determined to be on the High level twice and on the Low level four times.

For example, when the number of times the High level is detected is more than three times, the control circuit 10 may determine that the fingertip is not approaching the touch electrode EX1 (in non-touch state); when the number of times the High level is detected is fewer than three times, the control circuit 10 may determine that the fingertip is approaching the touch electrode EX1 (in touch state).

The control circuit 10 causes the switching circuit 14 to select successively the remaining touch electrodes EX2 through EXm and EY1 through EYn one by one and, as with the touch electrode EX1, determines whether each touch electrode is being touched (i.e., approached by the fingertip).

[Typical Structure of the Control Circuit 10]

Figure 8:
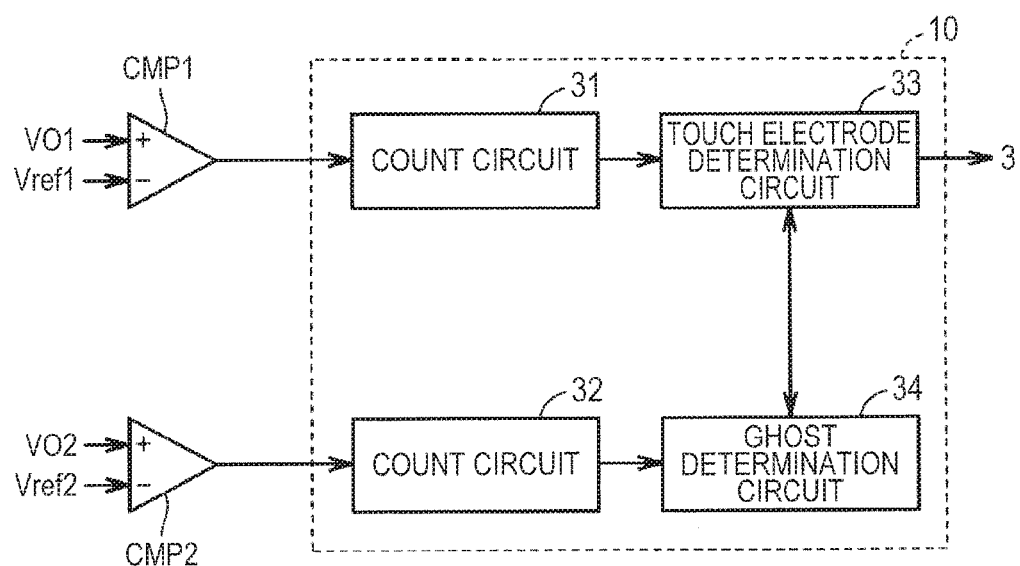
FIG. 8 is a block diagram showing a typical structure of major components in the control circuit 10.

FIG. 8 is a block diagram showing a typical structure of major components making up the control circuit 10. Referring to FIG. 8, the control circuit 10 includes count circuits 31 and 32, a touch electrode determination circuit 33, and a ghost determination circuit 34.

The count circuit 31, as explained above, counts the number of times the output of the comparator CMP1 in the first detection circuit 11 is set to the High level and to the Low level.

Based on the result of the counting by the count circuit 31, the touch electrode determination circuit 33 determines whether the fingertip has approached each touch electrode (in touch state). Also, the touch electrode determination circuit 33 determines whether a multi-touch state has occurred in which a plurality of touch electrodes in the first touch electrode group EX in FIG. 5 are being touched and in which a plurality of touch electrodes in the second touch electrode group EY are being touched.

The ghost determination circuit 34 identifies the actually touched coordinates (i.e., eliminates ghosts) in the event of a multi-touch state. Specifically, the ghost determination circuit 34 controls the voltage application circuit 13 to apply a voltage successively to the touch electrodes determined to be touched in the first touch electrode group EX, one by one. At this time, the comparator CMP2 in the second detection circuit 12 determines whether the voltage of each of the touch electrodes determined to be touched in the second touch electrode group EY exceeds the reference voltage Vref2. The count circuit 32 counts the number of clock signals occurring until the output of the comparator CMP2 is set to the High level. That is, what is measured here is the time it takes for the voltage of the touch electrodes EY in the touch state to exceed the reference voltage Vref2. The ghost determination circuit 34 identifies the actually touched coordinates based on the result of the counting by the count circuit 32. The operation of the ghost determination circuit 34 will be explained below in more detail.

[Detailed Operation of the Ghost Determination Circuit 34]

Figure 9:
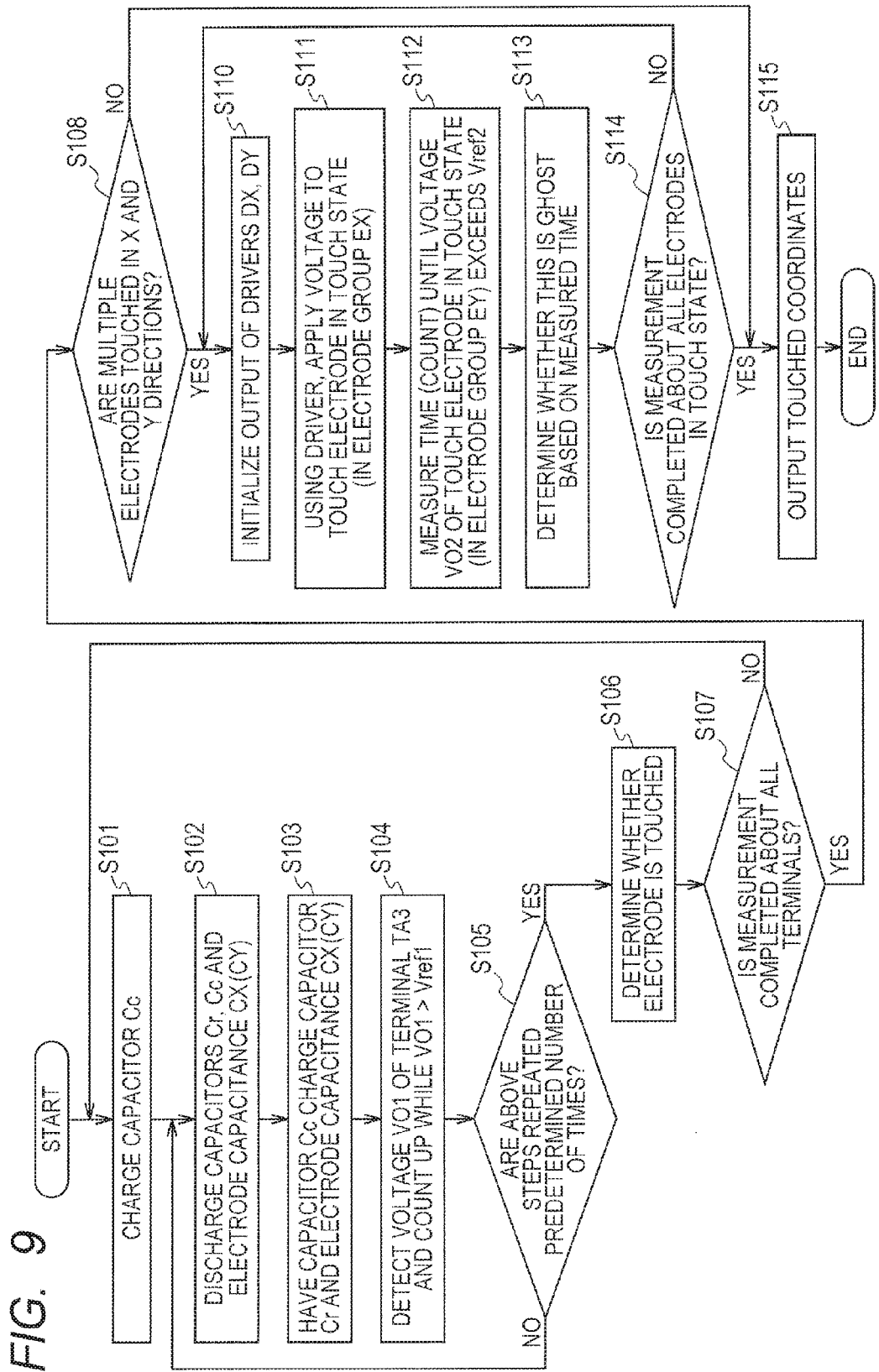
FIG. 9 is a flowchart showing the operation of the semiconductor device 1A indicated in FIG. 5.

FIG. 9 is a flowchart showing the operation of the semiconductor device 1A indicated in FIG. 5. How the semiconductor device 1A operates is explained below in reference to FIGS. 5 and 9. Steps S101 through S107 in FIG. 9 are substantially the same as the steps of the operation discussed above in reference to FIGS. 7A through 7C and thus will only be explained briefly. Steps S108 through S115 related to the ghost determination circuit 34 will be described in detail.

Initially, the output nodes of the drivers DA1 through DA3 are on the Low level; the output nodes of the drivers DX1 through DXm and DY1 through DYn are in the HiZ state; the switches SA1 through SA3, SX1 through SXm, and SY1 through SYn are in the on state; and the switch SB1 is in the off state.

First, the control circuit 10 sets the output node of the driver DA1 to the High level and the output nodes of the drivers DA2 and DA3 to the HiZ state. The control circuit 10 further sets the switches SA1, SA3 and SX1 to the on state and the switches SA2, SX2 through SXm, and SY1 through SYn to the off state. These settings cause the capacitor Cc to be charged (step S101).

Next, the control circuit 10 sets the switch SA1 to the off state, the output node of the driver DA1 to the HiZ state, and the output nodes of the drivers DA2 and DA3 to the Low level. These settings cause the capacitor Cc to be partially discharged and the capacitor Cr and touch electrode EX1 to be fully discharged (step S102).

Then the control circuit 10 sets the output nodes of the drivers DA2 and DA3 to the HiZ state. This allows part of the electrical charges in the capacitor Cc to charge the capacitor Cr and the capacitance CX1 of the touch electrode EX1 (step S103). The comparator CMP1 detects the voltage VO1 of the external terminal TA3 (i.e., divided voltage across the touch electrode EX1 to the ground node GND) and compares the detected voltage with the reference voltage Vref1. When the voltage VO1 is found higher than the reference voltage Vref1, the count circuit 31 in FIG. 8 counts up the number of times the High level is reached (step S104).

The discharging operation of step S102 and the detecting operation of steps S103 and S104 explained above are repeated a predetermined number of times (until the result of step S105 becomes "Yes"). After this, based on the count made by the count circuit 31, the control circuit 10 determines whether the touch electrode EX1 is touched (step S106). Thereafter, the similar measurement and determination are made successively regarding the touch electrodes EX2 through EXm and EY1 through EYn.

When the measurement is completed ("Yes" in step S107) about all touch electrodes EX1 through EXm and EY1 through EYn (i.e., about all external terminals TX1 through TXm and TY1 through TYn), the control circuit 10 determines whether there are a plurality of touch electrodes in the touch state in the touch electrode group EX and a plurality of touch electrodes in the touch state in the touch electrode group EY (step S108). When it is determined that there is one touch electrode in the touch state in at least one touch electrode group (no ghost generated in this case), the control circuit 10 outputs the coordinates of the location where the electrodes in the touch state intersect with one another (step S115). This step completes the processing.

When any ghost is generated ("Yes" in step S108), the control circuit sets the switches SA1 through SA3 to the off state and the switch SB1 to the on state. Furthermore, the control circuit 10 initializes to the Low level the output nodes of the drivers DX and DY coupled to the touch electrodes determined to be in the touch state (in both the first and the second touch electrode groups EX and EY)(step S110). These settings permit discharging of the touch electrodes determined to be in the touch state (in both the first and the second touch electrode groups EX and EY).

Next, the control circuit 10 selects one of the touch electrodes in the touch state in the second touch electrode group EY, and sets to the on state one of the switches SY1 through SYn that is coupled to the selected touch electrode. The control circuit 10 further selects one of the touch electrodes in the touch state in the first touch electrode group EX, and sets to the High level the output node of the driver DX coupled to the selected touch electrode. These settings allow a voltage to be applied to the touch electrode selected from the first touch electrode group EX (step S111), and cause the comparator CMP2 to compare the reference voltage Vref2 with the voltage VO2 of the touch electrode selected from the second touch electrode group EY. The count circuit 32 in FIG. 8 measures time (i.e., counts the number of clock signals) until the output of the comparator CMP2 reaches the High level (i.e., until the voltage VO2 exceeds the reference voltage Vref2)(step S112). When the measured time exceeds a predetermined time period, the control circuit 10 determines that the point of intersection between the touch electrode receiving the voltage and the touch electrode of which the voltage is being measured is actually touched (i.e., this is not a ghost)(step S113).

The above-described measurement and determination of steps S110 through S113 are carried out regarding all combinations of the touch electrodes in the touch state in the first touch electrode group EX and the touch electrodes in the touch state in the second touch electrode group EY. When the measurement and determination of steps S110 through S113 are completed regarding all the combinations ("Yes" in step S114), the control circuit 10 outputs the result of the determination (actually touched coordinates) and terminates the processing (step S115).

Effects of the Second Embodiment

According to the above-described semiconductor device 1A as the second embodiment of this invention, it is possible to identify uniquely the touched coordinates in a multi-touch state (with no ghost generated) while reducing power consumption.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A semiconductor device adapted to be coupled to a first touch electrode group in a first direction and to a second touch electrode group in a second direction intersecting with the first direction, the two touch electrode groups configuring a touch panel, the semiconductor device comprising:

a first detection circuit detecting whether stray capacitance of each of coupled touch electrodes configuring the first and the second touch electrode groups has increased in comparison with when the touch panel is not touched;

a control circuit determining whether there is a multi-touch state in which the stray capacitance of a plurality of coupled touch electrodes in the first touch electrode group and the stray capacitance of a plurality of coupled touch electrodes in the second touch electrode group increase;

a voltage application circuit applying a voltage to the coupled touch electrodes of which the stray capacitance increases in the first touch electrode group when the multi-touch state is in effect; and a second detection circuit detecting a voltage change of each of the coupled touch electrodes of which the stray capacitance has increased in the second touch electrode group when the voltage application circuit applies the voltage, wherein when the multi-touch state is in effect, the control circuit identifies a touched area over the touch panel based on the result of the detection by the second detection circuit, for detecting the stray capacitance of a given coupled touch electrode in the first and second touch electrode groups, the first detection circuit detects a voltage of the given coupled touch electrode when a predetermined voltage is applied to one of the ends of a first capacitive element of which the other end is serially coupled to the given coupled touch electrode, for detecting the stray capacitance of the given coupled touch electrode, the first detection circuit performs a precharging operation to precharge a second capacitive element coupled to the other end of the first capacitive element, after the precharging operation, the first detection circuit alternately performs a discharging operation and a detecting operation, the discharging operation discharging the given coupled touch electrode, the first capacitive element, and the second capacitive element, the detecting operation detecting the voltage of the given coupled touch electrode when the voltage of the second capacitive element is applied as the predetermined voltage to the other end of the first capacitive element, the first detection circuit includes a first counter configured to increment a counter value every time a detected voltage of the given coupled touch electrode exceeds a first predetermined reference voltage, during the detecting operation, the control circuit determines whether the stray capacitance of the given coupled touch electrode increases on the basis of the number of times the discharging operation is performed until the voltage of the given coupled touch electrode drops below the predetermined first reference voltage, based on the counter value of the first counter, when the first and second touch electrode groups each include coupled touch electrodes having an increased stray capacitance, the second detection circuit applies a voltage to one of the coupled touch electrodes of the first touch electrode group, and detects when a voltage of a corresponding coupled touch electrode in the second electrode group exceeds a predetermined second reference voltage, the second detection circuit includes a second counter to increment a counter value until the voltage of the corresponding coupled touch electrode in the second electrode group exceeds the predetermined second reference voltage, and the control circuit determines where on the touch panel is touched, based on the count value of the second detection circuit.

2. The semiconductor device according to claim 1, wherein, with the voltage application circuit applying the voltage to a given first coupled touch electrode in the first touch electrode group, when the time required for the voltage of a given second coupled touch electrode in the second touch electrode group to reach a predetermined first reference voltage is longer than when the touch panel is not touched, then the control circuit identifies as the touched area the area where the given first coupled touch electrode and the given second coupled touch electrode intersect with one another.

3. The semiconductor device according to claim 1, wherein, when there is one coupled touch electrode of which the stray capacitance has increased in the first touch electrode group and when there is one coupled touch electrode of which the stray capacitance has increased in the second touch electrode group, then the control circuit identifies as the touched area the area where the coupled touch electrode of which the stray capacitance has increased in the first touch electrode group and the coupled touch electrode of which the stray capacitance has increased in the second touch electrode group intersect with one another.

* * * * *